United States Patent [19]

McGary et al.

[11] Patent Number: 4,759,035
[45] Date of Patent: Jul. 19, 1988

[54] DIGITALLY CONTROLLED, ALL RATE EQUALIZER

[75] Inventors: John S. McGary; Norman R. Harris, both of Huntsville, Ala.

[73] Assignee: Adtran, Huntsville, Ala.

[21] Appl. No.: 103,500

[22] Filed: Oct. 1, 1987

[51] Int. Cl.[4] .............................................. H04L 25/03
[52] U.S. Cl. ........................................... 375/12; 333/18
[58] Field of Search .......................... 333/18; 370/97;
320/162:164; 375/12, 14, 121; 379/394, 414, 398

[56] References Cited

U.S. PATENT DOCUMENTS

| | | | |
|---|---|---|---|
| 3,437,760 | 4/1969 | Kawashima et al. | 370/97 |
| 3,537,007 | 10/1970 | Guanella | 325/42 |
| 3,578,914 | 5/1971 | Simonelli | 370/97 |
| 3,737,585 | 6/1973 | Ghosh | 370/97 |
| 3,745,257 | 7/1973 | Fudemoto et al. | 328/164 |
| 3,750,026 | 7/1973 | Watanabe | 325/321 |
| 3,758,863 | 9/1973 | Ungerboeck | 325/321 |
| 3,824,501 | 7/1974 | Harris | 375/14 |
| 3,849,744 | 11/1974 | Puruya | 333/28 |
| 3,857,048 | 12/1974 | de Lange de Meux et al. | 307/264 |
| 3,868,576 | 2/1975 | Bagdasarjanz | 325/65 |
| 4,003,006 | 1/1977 | Mandeville et al. | 375/12 |
| 4,069,392 | 1/1978 | Goldenborg et al. | 375/121 |
| 4,170,758 | 10/1979 | Tamburelli | 325/42 |
| 4,201,959 | 5/1980 | Niiro et al. | 333/16 |
| 4,243,956 | 1/1981 | Lemoussu et al. | 333/18 |
| 4,303,896 | 12/1981 | Slabinski | 333/28 |
| 4,351,060 | 9/1982 | Treiber | 375/12 |
| 4,411,000 | 10/1983 | Kustka | 375/11 |
| 4,413,240 | 11/1983 | Dyke | 333/17 |
| 4,435,825 | 3/1984 | Tomooka | 375/113 |
| 4,450,555 | 5/1984 | Pays | 370/31 |
| 4,468,786 | 8/1984 | Davis | 375/11 |
| 4,477,914 | 10/1984 | Murray et al. | 375/14 |
| 4,481,643 | 11/1984 | Kitazawa | 375/12 |
| 4,483,010 | 11/1984 | Takashima | 375/14 |
| 4,488,126 | 12/1984 | Suthers | 333/18 |
| 4,504,958 | 3/1985 | Tamburelli | 375/12 |
| 4,553,248 | 11/1985 | Reed | 375/14 |
| 4,555,788 | 11/1985 | Merrill | 375/11 |
| 4,571,732 | 2/1986 | Pirani et al. | 375/12 |
| 4,575,857 | 3/1986 | Murakami | 375/12 |
| 4,577,329 | 3/1986 | Brie et al. | 375/14 |
| 4,583,235 | 4/1986 | Domer et al. | 375/11 |
| 4,590,600 | 5/1986 | Beeman et al. | 375/99 |
| 4,592,068 | 5/1986 | Jessup et al. | 375/3 |

*Primary Examiner*—Benedict V. Safourek
*Attorney, Agent, or Firm*—Dann, Dorfman, Herrell & Skillman

[57] ABSTRACT

An all rate equalizer provides direct equalization of a data signal which is automatically adjusted based on data rate and transmission line. The equalizer is embodied in a closed loop circuit in which the amplitude of the data signal is the controlled parameter. The DC amplitude of the data signal is restored by an adjustable gain circuit and the bandwidth of the data signal is restored by an adjustable frequency circuit. The signal processing circuits are adjusted by a control processor in accordance with pre-determined tables of control signals corresponding to frequency and gain values required to provide equalization of the data signal for virtually any given data rate and transmission line. The all rate equalizer thereby automatically provides equalization of the data signal that is optimized for any combination of data rate and transmission.

16 Claims, 4 Drawing Sheets

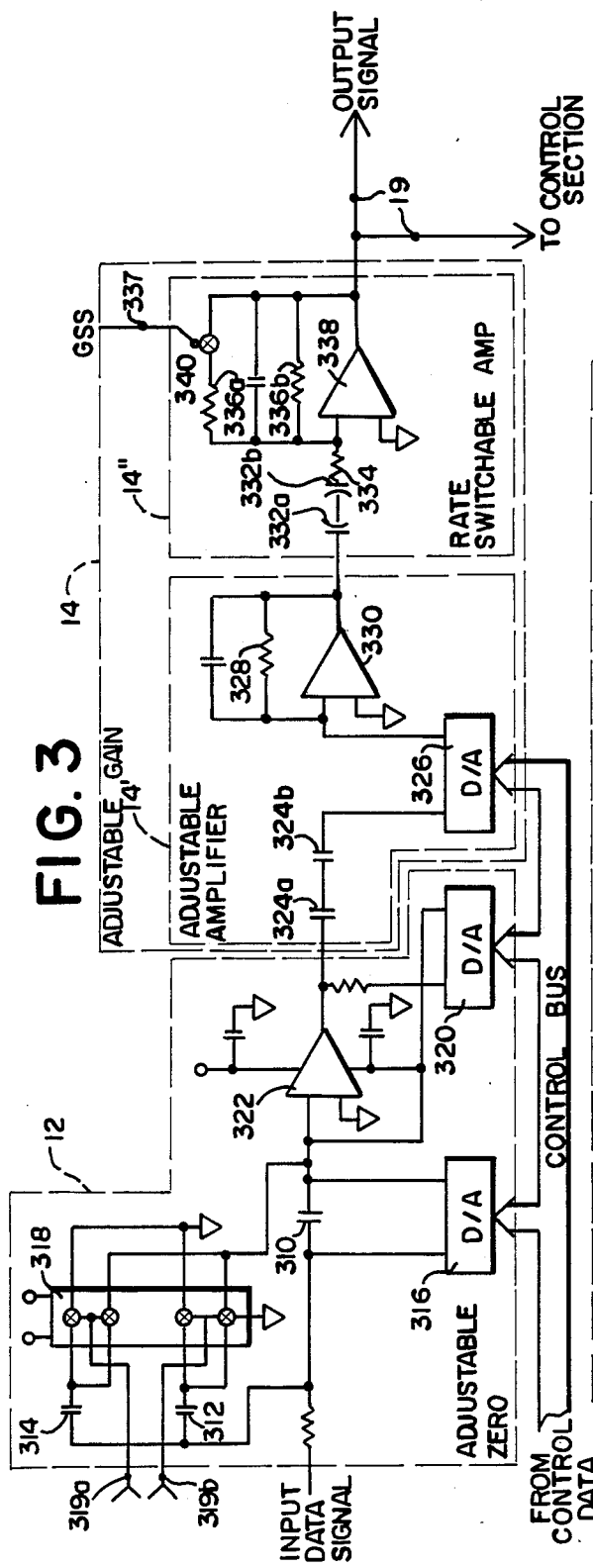
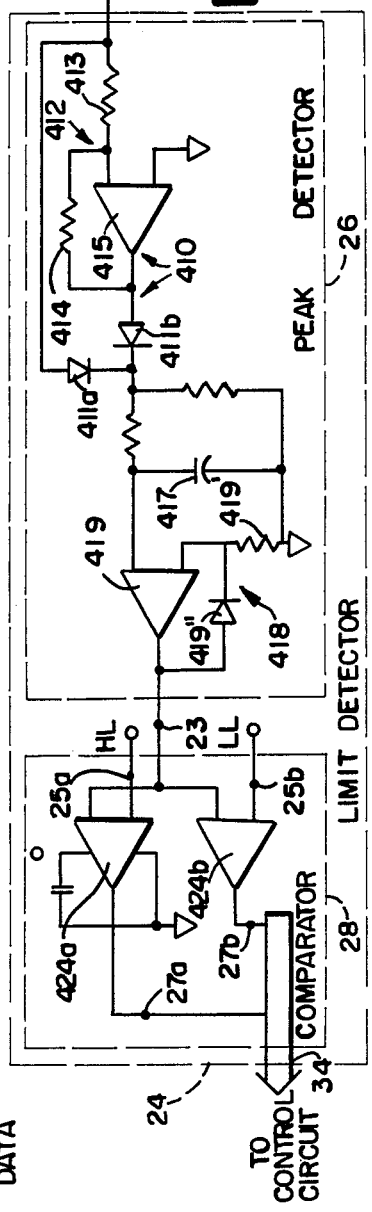
FIG. 3
FIG. 4

DIGITALLY CONTROLLED, ALL RATE EQUALIZER

BACKGROUND OF THE INVENTION

This invention relates to data communication systems, and in particular, to an equalizer for a digital transmission system, which compensates for distortion in a data signal at any data rate over a transmission line.

Known methods for equalization of data communication network signals can be divided into two general categories: line build-out schemes and direct compensation of the transmission line characteristics (i.e. direct equalization). Automatic line build-out techniques function by degrading the received signal to a known operating level representative of the maximum anticipated transmission line distance. A fixed equalizer circuit is used to restore the data signal to levels where the data can be recovered. Direct equalization techniques, on the other hand, restore the received data signal to a desired level without additional degradation. A direct equalization circuit provides restoration commensurate with the level of degradation in the data signal.

Known direct equalization methods often utilize some form of closed loop control, which is based on signal amplitude. Amplitude information is indicative of the cable characteristics because amplitude is closely controlled at the sending end of the transmission line. A major drawback to the known techniques is the inability to provide the best degree of compensation at the various operating data rates and line lengths. This problem is particularly severe when operating at very high data rates; for example, 56 kilobits/second (kb/s), and long transmission lines, for example, greater than 4–5 kilometers.

SUMMARY OF THE INVENTION

The present invention provides an equalizer which automatically and optimally compensates a distorted data signal by direct equalization at any practical combination of transmission line length and data rate.

The present invention provides direct equalization of a data signal which has been distorted with respect to amplitude and frequency bandwidth by a transmission line characterized by a transfer function having at least one pole at a particular frequency.

The invention includes signal processing means for receiving the data signal and providing an equalized output signal. The signal processing means includes an adjustable frequency compensator responsive to a first control signal for restoring the frequency bandwidth of the data signal. The adjustable frequency compensator provides an adjustable circuit which is characterized by a transfer function having at least one zero at substantially the same frequency as the pole of the transmission line. The signal processing means also includes an adjustable gain compensator which is responsive to a second control signal, for adjusting the amplitude of the data signal, thereby providing an equalized output signal.

The equalizer of the present invention includes a control loop comprising a limit detector, which is responsive to the equalized output signal for providing a limit signal indicating whether the peak amplitude of the equalized signal is within a pre-selected range. The control loop also includes a control processor which is responsive to the limit signal and a data rate signal for providing the first control signal to the adjustable frequency compensator and the second control signal to the adjustable gain compensator so as to adjust the adjustable frequency compensator and the adjustable gain compensator to bring the output signal within the pre-selected amplitude range. The first and second control signals are selected by the control processor from a table of first and second control signals corresponding to frequency and gain values required to provide equalization of a data signal for a given data rate and a given transmission line length as represented by the pre-selected amplitude range.

The present invention operates in a closed loop configuration with the amplitude of the data signal as the controlled parameter. The amplitude of the data signal is restored by adjusting the adjustable gain compensator and the bandwidth of the data signal is restored by adjusting the adjustable frequency compensator in accordance with pre-determined tables of control signals. The present invention thus provides equalization that is optimized for any combination of data rate and transmission line length.

BRIEF DESCRIPTION OF THE DRAWINGS

The foregoing summary, as well as the following detailed description of a preferred embodiment of the invention, will be better understood in conjunction with the appended drawings, in which:

FIG. 3 is a schematic diagram of a preferred signal processing circuit of the equalizer of FIG. 1.

FIG. 4 is a schematic diagram of a preferred limit detector circuit utilized in the control circuit of the equalizer of FIG. 1

DETAILED DESCRIPTION OF THE INVENTION

Figure 1:
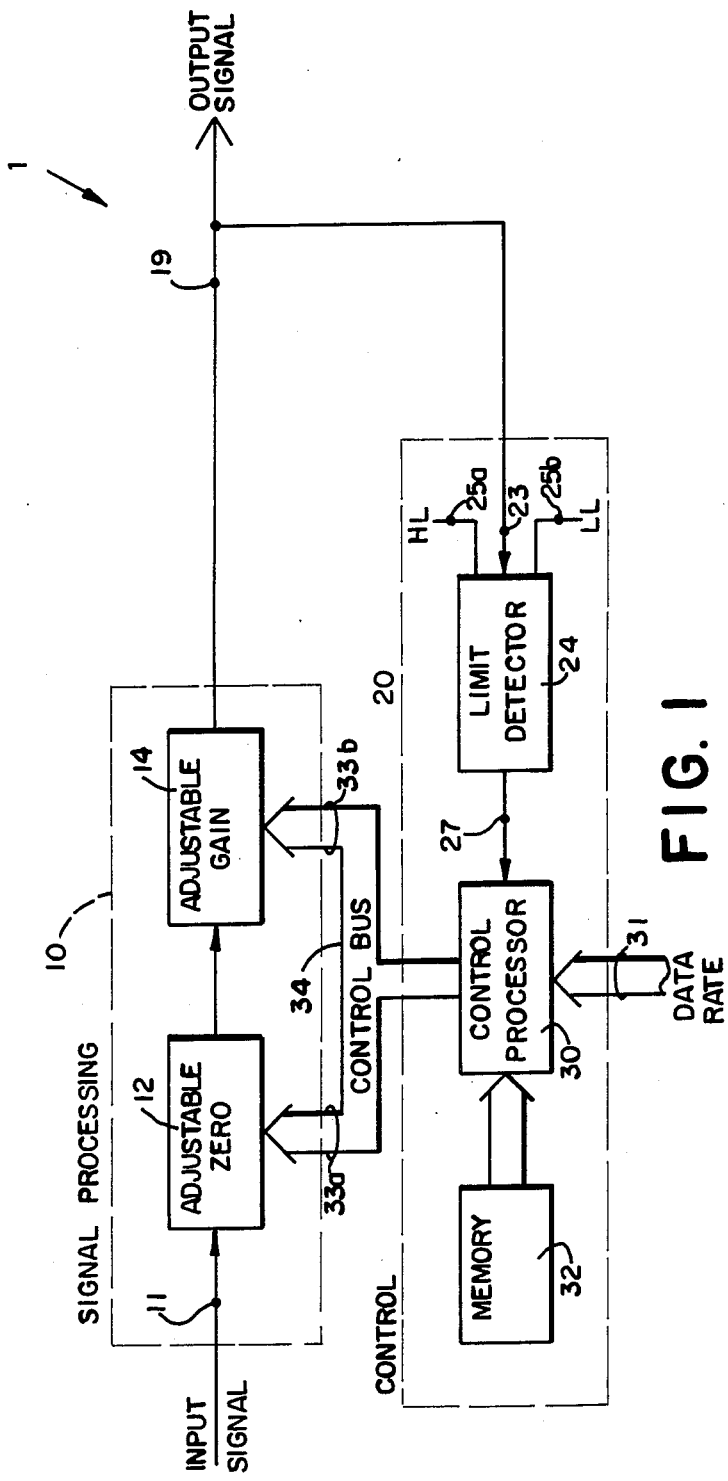
FIG. 1 is a block diagram of an all rate equalizer according to the present invention.

Referring now to the drawings, and in particular to FIG. 1, there is shown an equalizer 1 according to the present invention. The equalizer 1 includes a signal processing section 10 which receives an input data signal 11 and provides an equalized output signal 19. Equalizer 1 also includes control section 20 which is essentially a feedback loop for adjusting the output signal 19. The signal processing section 10 includes an adjustable zero circuit 12 connected to an adjustable gain circuit 14. The control section 20 includes a limit detector 24 connected to receive the output signal 19, a control processor 30 connected to receive a data rate signal 31 and a limit signal 27 from limit detector 24, and a memory device 32 connected to be accessed by control processor 30. The control processor 30 and signal processing section 10 are interconnected by means of a control bus 34.

The input signal 11, for example, a bipolar data signal, is received from a data communication system network transmission line. A bipolar signal is characterized by having the binary 1 transmitted as a positive or negative pulse, with each successive pulse alternating in polarity. A binary 0 is transmitted by the absence of a pulse. In practice, the input signal 11 can be coupled from the transmission line by a transformer into a low pass filter prior to entering the signal processing section 10. The input signal 11 is distorted due to the transmission line.

Distortion of the input signal 11 depends on the transmission line length and can range from slight amplitude loss to severe amplitude and timing degradation. The transmission line is characterized by a transfer function having at least one pole term at a certain frequency. The amplitude and bandwidth of the originally transmitted signal are altered in accordance with the transmission line transfer function.

The input signal 11 passes through the adjustable zero circuit 12 where it is compensated for distortion resulting from frequency bandwidth attenuation. As will be described more fully hereinbelow, the adjustable zero circuit 12 provides a circuit which is characterized by a transfer function having at least one zero term at substantially the same frequency as the pole term of the transmission line transfer function. The bandwidth compensated signal passes through the adjustable gain circuit 14 where its amplitude is restored to provide an equalized output signal 19 from which the data can be recovered. The signal processing section 10 operates as an inverse filter which equalizes the input signal 11 for losses in the transmission medium at the frequency of operation.

The degree of compensation provided by the adjustable zero circuit 12 and the adjustable gain circuit 14 is controlled by the control processor 30 through the control bus 34. The control processor 30 provides a first control signal 33a corresponding to a zero frequency adjustment value to the adjustable zero circuit 12. Control processor 30 also provides a second control signal 33b corresponding to an amplitude compensation value to the adjustable gain circuit 14. Operation of the control section is based on the amplitude of the equalized output signal 19 and a data rate signal 31. The data rate signal 31 indicates to the control processor 30 the operating frequency of the data communication system.

The equalized output signal 19 is fed back to the limit detector circuit 24 which determines the peak amplitude of the output signal 19. The limit detector 24 compares the peak amplitude to both an upper-limit signal 25a corresponding to a maximum amplitude limit and a lower-limit signal 25b corresponding to a minimum amplitude limit. On the basis of the comparison, limit detector 24 provides a limit signal 27 to the control processor 30 indicating whether or not the output signal 19 is within a preselected range defined by the maximum and minimum limits.

In response to the limit signal 27 and the data rate signal 31, control processor 30 modifies the adjustable zero circuit 12 and the adjustable gain circuit 14 to force the amplitude of the output signal 19 to fall within the preselected range.

Figure 2:
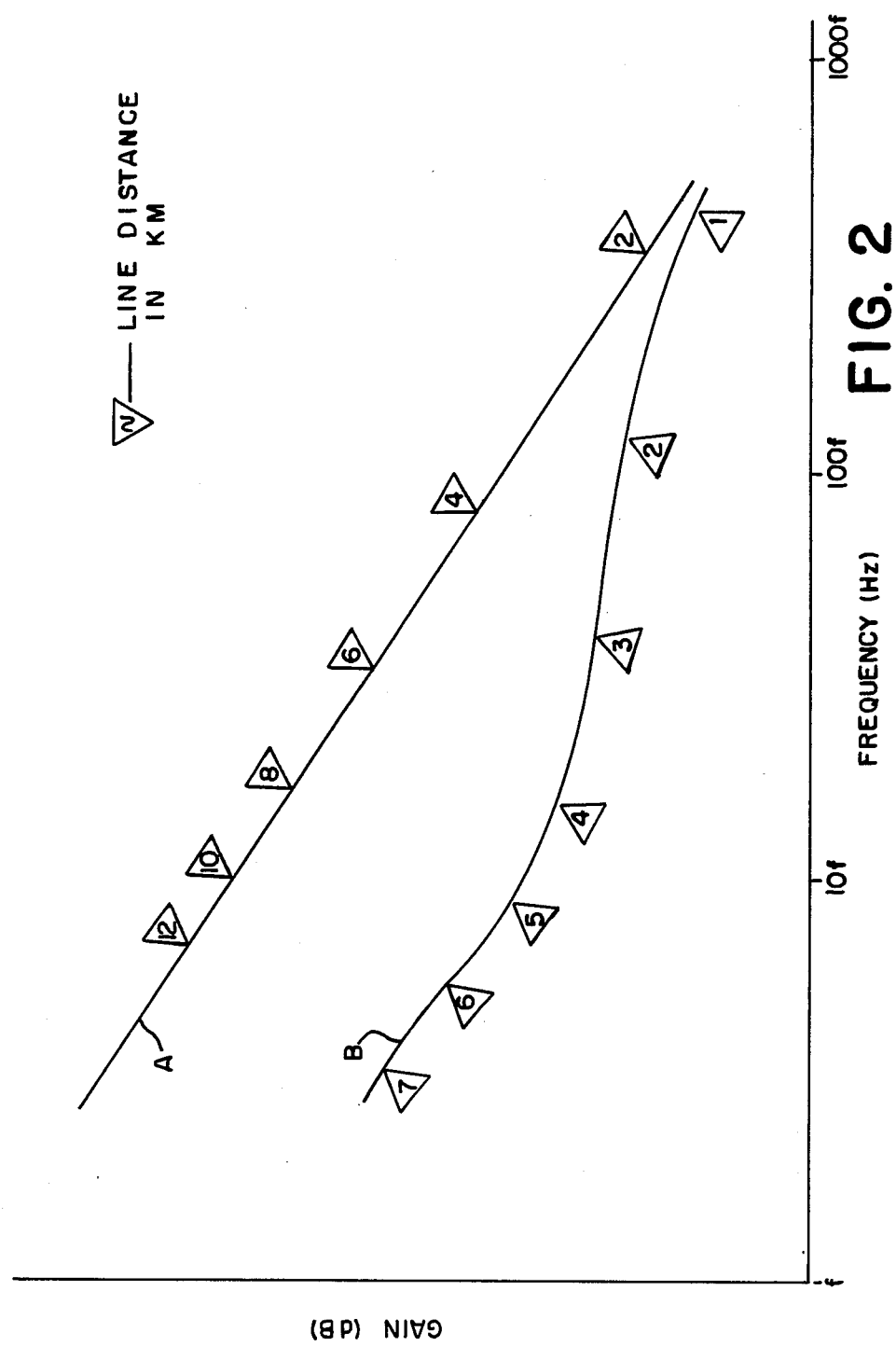
FIG. 2 is a semilogarithmic graph of typical line compensation curves for two rates of data transmission showing the relationship between gain and frequency for optimum equalization.

Data for controlling the adjustable zero circuit 12 and the adjustable gain circuit 14 is contained in the memory device 32 in the form of compensation tables. These compensation tables are developed by measuring the frequency and gain adjustment values necessary to achieve the best equalization for different combinations of data rate and transmission line length. The frequency and gain values are determined empirically by obtaining a fixed amplitude and open-eye pattern for a given data signal transmitted over various lengths of transmission line at various data rates. FIG. 2 shows two curves which are representative of optimum compensation values for a transmission line. Curve A corresponds to a transmission line operated at a low data rate, e.g. 2.4 kb/s, and curve B corresponds to a transmission line operated at a high data rate, e.g. 56 kb/s. The numbered pointers located next to the respective curves locate the compensation gain and frequency values for integral lengths of transmission line. Utilizing information from the curves of FIG. 2, tables of control signals corresponding to frequency and gain compensation values can be compiled for storage in the memory device 32. Similar tables may be constructed for other data rates and transmission lines as well.

Figure 5:
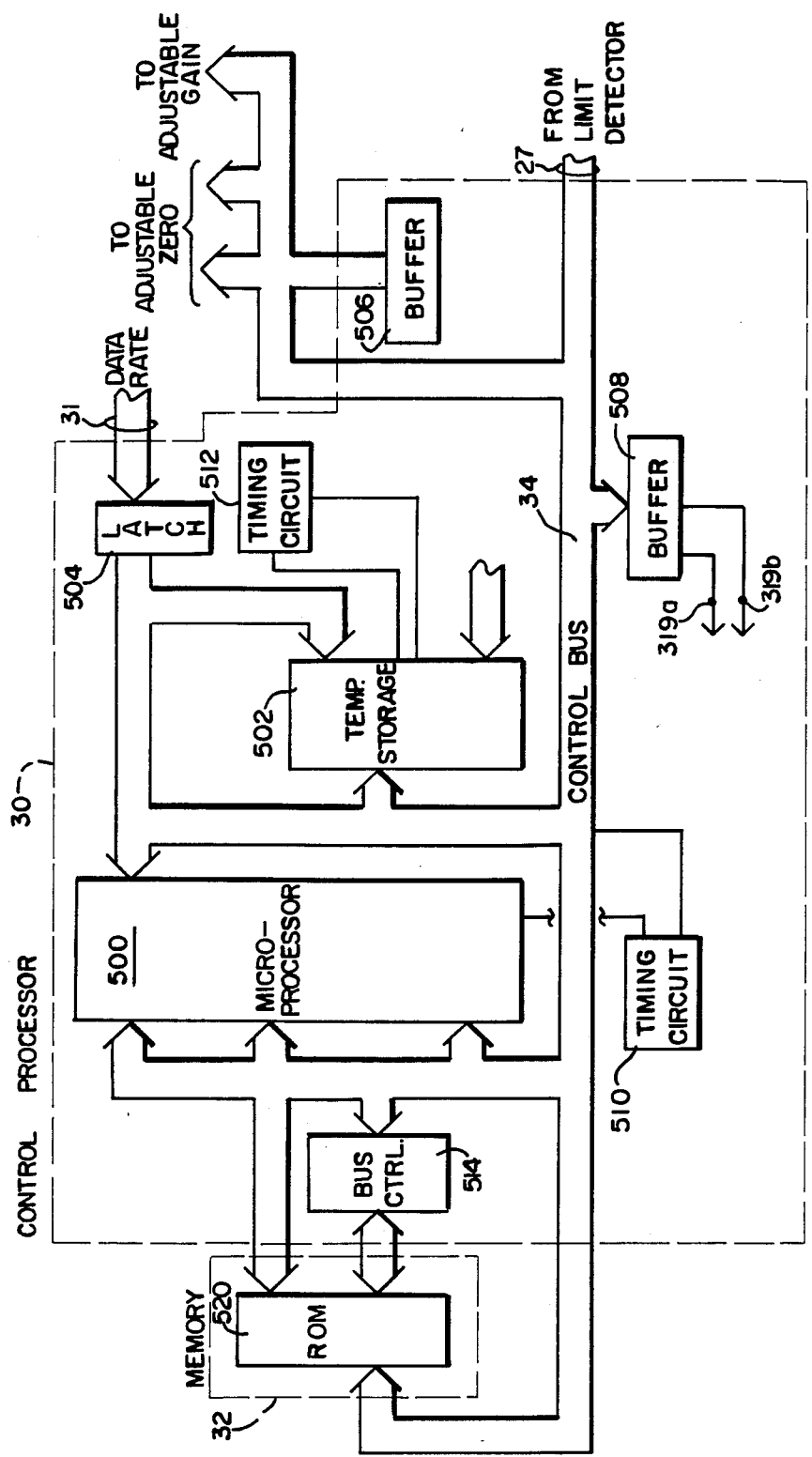
FIG. 5 is a schematic diagram of a preferred circuit for the control processor and associated memory in the control circuit of the equalizer of FIG. 1

Referring now to FIGS. 3, 4, and 5, there are shown preferred circuit schemes embodying the all rate equalizer of the present invention. FIG. 3 is a schematic diagram of the signal processing section 10 shown in FIG. 1. The adjustable zero circuit 12 includes an adjustable RC network and an amplifier stage. The adjustable RC network includes the capacitors 310, 312, and 314. A digital to analog (D/A) chip 316 forms the resistive element of the RC network. The amplifier stage includes an operational amplifier 320 and D/A chip 322. Capacitors 312 and 314 are switched into the RC circuit by an analog switch 318.

The D/A chip 316 is utilized as a digitally controlled resistor. The amount of resistance is set by a first control signal from the control processor 30. Such chips are commercially available from manufacturers such as National Semiconductor Corp. of Santa Clara, Calif. The frequency of the transfer function zero term is established by the RC time constant of the capacitors 310, 312, and 314 in parallel with the D/A resistor chip 316.

The frequency range of the adjustable zero circuit 12 is modified by using different combinations of the switched capacitors 312 and 314 in parallel with the unswitched capacitor 310. Capacitor 310 is utilized alone to cover the high frequency range of the compensation curve, whereas capacitor 312 is switched in parallel with capacitor 310 to cover the mid-range portion of the curve. Capacitor 314 is switched in parallel with both capacitors 310 and 312 to cover the low frequency section of the compensation curve. The capacitors 312 and 314 are inserted into the RC circuit with the analog switch 318, which is controlled by the two control signals, 319a and 319b from control processor 30. Control signals 319a and 319b constitute a third control signal.

The D/A chip 322 is utilized as a feedback resistance and is set by the first control signal to provide the same value of resistance as the D/A chip 316. By tracking the time constant resistance with the feedback resistance, the DC gain of the circuit is always 1, thereby achieving a true zero function having no shift in low frequency base line gain as the frequency is adjusted.

The adjustable zero circuit 12 thereby functions as an adjustable frequency compensator by providing a circuit characterized by a transfer function having at least one zero term at substantially the same frequency as the pole term in the transfer function of the transmission line. The adjustable zero circuit 12 effectively cancels the pole term, thereby restoring the frequency bandwidth of the input signal 11 to essentially its pre-transmission value.

In the embodiment shown in FIG. 3, the adjustable gain circuit 14 includes an adjustable amplifier stage 14' and a switchable amplifier stage 14''. The adjustable zero circuit 12 is connected to the adjustable amplifier stage 14' through the coupling capacitors 324a and 324b. The adjustable amplifier stage 14' is configured as an inverting amplifier in which the feed forward resistance is a D/A chip 326 utilized as a digitally controlled resistor. A second resistor 328 provides the feedback around the operational amplifier 330. The resistance value of D/A chip 326 set by a control signal 33b from control processor 30 over the control bus 34. Adjustable gain circuit 14 operates as a gain compensator by adjusting the DC amplitude of the frequency compensated signal from the adjustable zero circuit 12, thereby providing an output signal 19, which is equalized with respect to both frequency and amplitude.

In the embodiment shown in FIG. 3, the output of the adjustable amplifier stage 14' is coupled to a rate switchable amplifier stage 14" through coupling capacitors 332a and 332b. Gain is provided in the rate switchable gain stage 14' by an inverting amplifier including a feed forward resistor 334 and feedback resistors 336a and 336b connected around an operational amplifier 338. The rate switchable amplifier stage 14" has two functions. First, the added gain of the switchable stage reduces the gain bandwidth requirements of the adjustable amplifier stage 14'. The switchable gain stage 14" also provides additional amplification at a preselected data rate. An analog switch 340 is controlled with a gain select signal 337 corresponding to a preselected data rate. The gain select signal 337 constitutes a fourth control signal. At data rates other than the preselected rate, the analog switch 340 is closed and the feedback resistance is the parallel combination of resistances 336a and 336b. When the communication network is operating at the preselected data rate, however, the analog switch 340 is opened, resulting in the feedback resistance 336a being switched out of the feedback circuit, thereby increasing the gain.

The output signal 19 from the adjustable gain circuit 14 is furnished to the data processing circuitry in the receiving station as a high-level, equalized signal. Amplitude and timing distortions caused by the transmission line have been sufficiently removed to allow reliable recovery of the transmitted data. Output signal 19 is also directed to the control section 20.

Referring now to FIG. 4, the limit detector 24 receives the output signal 19 from the signal processing section 10. Limit detector 24 includes a peak detector circuit 26 and a comparator circuit 28.

The peak detector circuit 26 determines the peak amplitude of the output signal 19 and provides a peak amplitude signal 23 to the comparator circuit 28. The peak detector 26 includes a full wave rectifier 410, a storage capacitor 417, and a buffer amplifier 418. The full wave rectifier 410 is constructed with the two diodes 411a and 411b, and the inverting amplifier 412 consisting of a feed-forward resistance 413, a feedback resistance 414, and operational amplifier 415. The peak amplitude of the output signal 19 is stored in capacitor 417. The buffer amplifier 418, which includes the operational amplifier 419, resistor 419', and diode 419", provides compensation of the peak amplitude signal 23 for any loss sustained in the rectifier circuit 410. The peak amplitude signal 23 is input to the comparator circuit 28.

The comparator circuit 28 compares the peak amplitude signal 23 to the upper- and lower-limit signals 25a and 25b to provide the limit signal 27. The comparator circuit is configured with dual comparators 424a and 424b. The comparators 424a and 424b each receive the peak amplitude signal 23 from peak detector 26. Additionally, comparator 424a receives the upper-limit signal 25a and comparator 424b receives the lower-limit signal 25. When the peak amplitude signal is less than the lower-limit signal 25b, the comparator circuit 28 provides a first code, e.g. two 0 bits, over the control bus 34. When the peak amplitude signal is greater than the lower-limit signal 25b but less than the upper-limit signal 25a, the comparator 28 provides a second code, e.g. a 0 and a 1 bit, over the control bus 34. Similarly, when the peak amplitude signal is higher than the upper-limit signal 25a, the comparator circuit provides a third signal, e.g., two 1 bits over the control bus 34. The bit code provided by the comparator 28 gives an indication of whether the peak amplitude of the output signal is below, within, or above predetermined amplitude limits. This information is provided to the control processor 30 via the control bus 34.

Referring now to FIG. 5, there is shown a schematic diagram for a preferred circuit embodying the control processor and memory of the control section 20. The control processor 30 is constructed around a microprocessor 500. Suitable microprocessor chips are commercially available from Intel, Corp. of San Jose, Calif. Peripheral devices include the temporary storage chip 502, data latch 504, and buffers 506 and 508: timing chips 510 and 512; and a bus control chip 514. The memory chip 520 contains the line compensation tables, together with the real time control program code for the microprocessor 500. Memory chip 520 is embodied in a read only memory (ROM) type storage device.

The data rate signal 31 of the communication network is input to the control processor 30 through the data latch 504. Microprocessor 500 periodically interrogates the data latch 504 to obtain the data rate signal 31, thereby insuring that the correct compensation values will be used for the equalization process. Based on the limit signal 27 from the limit detector 24 and the data rate signal 31, the microprocessor 500 accesses the ROM 520 to obtain codes corresponding to the amount of gain compensation and the zero frequency for a given length of transmission line. These codes are provided to the adjustable zero circuit 12 and to the adjustable gain circuit 14 respectively, in order to configure those circuits as previously described, so as to provide optimum equalization of the data signal.

To illustrate the operation of the all rate equalizer according to the present invention, the case of a six kilometer transmission line operating at 56 kb/s will be considered. The equalizer 1 selects compensation values for a 56 kb/s data rate as instructed by the control processor 30 based on the data rate signal 31. The real time control program starts at the minimum loss location (i.e. 0 km.). The resulting output signal 19 will be below the lower limit of acceptable amplitude. This will cause the control processor 30 to increase the gain of the adjustable gain circuit 14 and to reconfigure the adjustable zero circuit 12 in accordance with the corresponding values for a 56 kb/s characteristic curve similar to that shown in FIG. 2. The control processor 30 continues to select gain and zero frequency values from the memory 32 and provides corresponding control signals 33a and 33b to adjust the adjustable zero and adjustable gain circuits 12 and 14 until the amplitude of output signal 19 is within the bounds of the upper and lower limit signals 25a and 25b as determined by limit detector 24. The output signal 19 will be fully equalized when the gain and zero frequency values correspond to those at the six kilometer point on the characteristic curve. Since the equalization control is a closed loop operation, nominal variations of line characteristics will be automatically compensated for by the servo action of the control loop.

Some of the many advantages and novel features of the invention should now be apparent in view of the foregoing description and accompanying drawings. For example, an automatically controlled equalizer has been described which compensates for distortion in a received data signal by direct equalization. Equalization is accomplished by an adjustable zero circuit which provides frequency compensation and an adjustable gain circuit to provide amplitude compensation. The degree of frequency and amplitude compensation is controlled based on the data rate and transmission line characteristic. The adjustable zero and adjustable gain circuits are reconfigured by a control processor in accordance with a table of optimum compensation values stored in the processor's memory. The compensation circuits are adjusted incrementally until the output signal is within desired amplitude limits. The equalizer thus can provide the optimum degree of compensation for any data rate and transmission line.

It will be recognized by those skilled in the art that changes may be made to the above-described embodiment without departing from the broad inventive concepts of the invention. For example, the adjustable zero and adjustable gain circuits need not be connected in the order described and shown. Also, the additional gain provided by the rate switchable amplifier stage could be provided by other means. It is understood, therefore, that the invention is not limited to the particular embodiment which is disclosed, but is intended to cover modifications and changes which are within the scope and spirit of the invention as defined in the appended claims.

What is claimed is:

1. Apparatus for equalizing a data signal which has been distorted with respect to amplitude and frequency bandwidth by a transmission line characterized by a transfer function having at least one pole term at a frequency, said apparatus comprising:
   signal processing means responsive to first and second control signals for receiving the data signal, adjusting the frequency bandwidth of the data signal in response to the first control signal and adjusting the amplitude of the data signal in response to the second control signal so as to provide an output signal;
   means for providing a data rate signal indicating the data rate of the data signal;
   means for providing a preselected amplitude signal corresponding to an acceptable amplitude range for the data signal; and
   control means responsive to the output signal, the preselected amplitude signal, and the data rate signal for providing the first and second control signals to said signal processing means so as to adjust the data signal to bring the output signal within the acceptable amplitude range, whereby equalization of the data signal is provided for a given data rate and transmission line.

2. Apparatus as recited in claim 1 wherein said signal processing means comprises adjustable frequency compensation means, responsive to the first control signal providing a circuit which is characterized by a transfer function having at least one zero at substantially the same frequency as the pole of the transmission line transfer function.

3. Apparatus as recited in claim 1 wherein said signal processing means comprises adjustable gain compensation means, responsive to the second control signal, for adjusting the amplitude of the data signal.

4. Apparatus as recited in claim 1 wherein said control means comprises:
   limit detection means responsive to the output signal for providing a limit signal indicating whether the peak amplitude of the output signal is within the acceptable amplitude range;
   memory means for storing a plurality of first and second control signals corresponding to frequency and gain adjustment values required to equalize the data signal for the particular transmission line and data rate; and
   processor means responsive to the limit signal and the data rate signal for accessing the first and second control signals from said memory means, and providing the first and second control signals to said signal processing means until the output signal is within the acceptable amplitude range.

5. Apparatus for equalizing a data signal which has been distorted with respect to amplitude and frequency bandwidth by a transmission line characterized by a transfer function having at least one pole term at a frequency, said apparatus comprising:
   signal processing means for receiving the data signal and providing an equalized output signal, said signal processing means including adjustable frequency compensation means, responsive to a first control signal, for restoring the frequency bandwidth of the data signal, said adjustable frequency compensation means providing a circuit which is characterized by a transfer function having at least one zero term at substantially the same frequency as said pole term of the transmission line transfer function and adjustable gain compensation means connected to said adjustable frequency compensation means and responsive to a second control signal for adjusting the amplitude of the data signal;
   limit detection means responsive to the output signal for providing a limit signal indicating whether the peak amplitude of the output signal is within a preselected amplitude range;
   means for providing a data rate signal indicating the data rate of the data signal; and
   processor means responsive to the limit signal and the data rate signal for providing the first control signal to said adjustable frequency compensation means and the second control signal to said adjustable gain compensation means so as to adjust said adjustable frequency compensation means and said adjustable gain compensation means to bring the output signal within the preselected amplitude range, so as to provide equalization of the data signal for a given data rate and transmission line.

6. Apparatus as recited in claim 5 wherein said processor means comprises:
   memory means for storing a plurality of first and second control signals corresponding to frequency and gain values required to equalize the data signal for the given data rate and transmission line;
   means for accessing respective first and second control signals from said memory means; and
   means for conveying the accessed first and second control signals to said adjustable frequency compensation means and said adjustable gain compensation means respectively.

7. Apparatus as recited in claim 5 wherein said processor means comprises means for providing a third control signal indicating a frequency range; and said adjustable frequency compensation means comprises:
   variable resistance means for providing an electrical resistance in response to the first control signal; and switchable capacitance means connected with said variable resistance means, for providing an electrical capacitance in response to the third control signal so that an RC circuit is provided which is tunable to the frequency of the pole in the transfer function of the transmission line.

8. Apparatus as recited in claim 7 wherein said adjustable frequency compensation means has a predetermined frequency range and comprises means connected to said RC circuit for maintaining the gain of said adjustable frequency compensation means substantially at unity within said frequency range.

9. Apparatus as recited in claim 8 wherein said unity gain maintaining means comprises an amplifier and second variable resistance means connected to said amplifier for providing a feedback resistance for said amplifier in response to the first control signal.

10. Apparatus as recited in claim 5 wherein said adjustable gain compensation means comprises an adjustable amplifier having a third variable resistance means responsive to the second control signal for providing a feed-forward resistance in said adjustable amplifier.

11. Apparatus as recited in claim 10 wherein said processor means comprises means for providing a fourth control signal corresponding to a preselected value of a data signal parameter; and said adjustable gain compensation means further comprises switched means connected to said adjustable amplifier for providing additional gain to the data signal, said switched means providing a higher amount of additional gain in response to the fourth control signal.

12. Apparatus as recited in claim 10 wherein said processor means comprises means for providing a fourth control signal corresponding to a preselected data rate, and said adjustable gain compensation means further comprises switched amplifier means for providing additional gain to the data signal, said switched amplifier means providing a higher amount of additional gain in response to the fourth control signal.

13. Apparatus as recited in claim 5 wherein said limit detection means comprises peak detection means responsive to the output signal for determining the peak amplitude of the output signal so as to provide a peak amplitude signal.

14. Apparatus as recited in claim 13 wherein said limit detection means further comprises means for providing a lower limit signal indicating the lower limit of the preselected amplitude range and comparator means for comparing the peak amplitude signal to the lower limit signal, said comparator means providing a first limit signal when the peak amplitude signal is less than the lower limit signal and providing a second limit signal when the peak amplitude signal is greater than the lower limit signal.

15. Apparatus as recited in claim 14 wherein said limit detection means further comprises means for providing an upper limit signal indicating the upper limit of the preselected amplitude range and second comparator means for comparing the peak amplitude signal to the upper limit signal, said second comparator means providing a third limit signal when the peak amplitude signal is less than the upper limit signal and providing a fourth limit signal when the peak amplitude signal is greater than the upper limit signal.

16. Apparatus as recited in claim 13 wherein said limit detection means comprises means for providing a lower limit signal indicating the lower limit of the preselected amplitude range, means for providing an upper limit signal indicating the upper limit of the preselected amplitude range, and comparator means for comparing the peak amplitude signal to said lower and upper limit signals, said comparator means providing a first limit signal when the peak amplitude signal is less than the lower limit signal, a second limit signal when the peak amplitude signal is between the lower and upper limit signals, and a third limit signal when the peak amplitude is greater than the upper limit signal.

* * * * *